US008831511B2

(12) United States Patent
Reyner

(10) Patent No.: US 8,831,511 B2
(45) Date of Patent: Sep. 9, 2014

(54) TECHNIQUES FOR INTEROPERABILITY BETWEEN BARCODES AND NEAR FIELD COMMUNICATIONS

(75) Inventor: Morrison Reyner, Lake Mary, FL (US)

(73) Assignee: NCR Corporation, Duluth, GA (US)

( * ) Notice: Subject to any disclaimer, the term of this patent is extended or adjusted under 35 U.S.C. 154(b) by 141 days.

(21) Appl. No.: 13/165,361

(22) Filed: Jun. 21, 2011

(65) Prior Publication Data

US 2012/0329386 A1 Dec. 27, 2012

(51) Int. Cl.
*H04B 5/00* (2006.01)

(52) U.S. Cl.
USPC ....................... 455/41.1; 455/41.2; 455/556.1

(58) Field of Classification Search
CPC ........................................................ G06F 5/00
USPC .................. 455/41.1, 41.2, 556.1, 556.2, 564
See application file for complete search history.

(56) References Cited

U.S. PATENT DOCUMENTS 8,174,378 B2 * 5/2012 Richman et al. .............. 340/521
2006/0088166 A1 * 4/2006 Karusawa ..................... 380/277
2007/0250383 A1 * 10/2007 Tollinger et al. ................ 705/14
2010/0114683 A1 * 5/2010 Wessels et al. ............ 705/14.13

OTHER PUBLICATIONS

Search Report for European Application No. 12164584.0-1811 dated Aug. 29, 2013.

* cited by examiner

*Primary Examiner* — Tuan H Nguyen
(74) *Attorney, Agent, or Firm* — Joseph P. Merhle

(57) ABSTRACT

A mobile converter application is configured for installment on a mobile device. The mobile converter device provides interoperability between barcodes and NFC codes by translating barcodes to equivalent NFC codes and by translating NFC codes to equivalent barcodes. This enables the mobile device to transact with endpoint devices using either barcode technology or NFC technology depending on the capabilities of the endpoint devices.

20 Claims, 3 Drawing Sheets

100

110 CONFIGURE A MOBILE CONVERTER APPLICATION (MCA) FOR A TARGET MOBILE DEVICE (TMD)

111 PROVIDE A PREFERENCE SETTING WITH THE MCA THAT AUTOMATICALLY PERFORMS THE CONVERSIONS WITHOUT ACTION OF A USER FOR THE TMD

112 PROVIDE A POPUP INTERFACE WINDOW DURING OPERATION OF THE MCA THAT MANUALLY PROMPTS A USER FOR THE TMD ON WHETHER TO AUTOMATICALLY PERFORM THE CONVERSIONS, THE POPUP INTERFACE INITIATED BY DELIVERY OF A PARTICULAR BARCODE OR A PARTICULAR NFC CODE OR BY THE TMD BEING PLACED IN COMMUNICATION WITH AN NFC READER.

120 DISTRIBUTE THE MCA TO THE TMD

130 INITIATE THE MCA ON THE TMD, THE MCA RESIDENT IN THE TMD:FO R CONVERTING BARCODES TO NEAR FIELD COMMUNICATION (NFC) CODES AND THE NFC CODES TO THE BARCODES FOR AUTOMATED TRANSACTIONS OR FOR REMOTELY ACQUIRING CONVERSIONS FOR THE BARCODES TO NFC CODES AND THE NFC CODES TO THE BARCODES

113 PROVIDE PROCESSING WITHIN THE MCA THAT MONITORS THE TMD TO AUTOMATICALLY DETECT WHEN A PARTICULAR BARCODE OR A PARTICULAR NFC CODE IS RECEIVED ON THE TMD

114 PROVIDE THE MCA WITH A DETECTION MECHANISM TO IDENTIFY INFORMATION EMBEDDED IN A PARTICULAR BARCODE AS AN INSTRUCTION TO AUTOMATICALLY CONVERT THE PARTICULAR BARCODE TO AN EQUIVALENT NFC CODE

121 PUSH THE MCA OVER A WIRELESS OR CELLULAR NETWORK TO THE TMD

122 PREFABRICATE THE MCA WITHIN THE TMD FOR SALE WITH THE TMD

123 INSTALL THE MCA VIA A WIRED CONNECTION TO A PROCESSING DEVICE CONNECTED VIA THE WIRED CONNECTION TO THE TMD

131 PROVIDE OVER A NETWORK CONNECTION A LICENSE KEY TO THE MCA THAT LOADS AND INITIATES THE MCA ON THE TMD

132 RECEIVE PAYMENT FROM A USER BEFORE PROVIDING THE LICENSE KEY THAT ACTIVATES THE MCA

TECHNIQUES FOR INTEROPERABILITY BETWEEN BARCODES AND NEAR FIELD COMMUNICATIONS

BACKGROUND

Consumers are increasingly using automated mechanisms to perform every day transactions. Kiosks exist to avoid enterprise personnel and lines. These automated kiosks allow consumers to perform transactions with an enterprise or agency with little to no human intervention.

By and large, the use of barcodes and Quick Response code (QR code and a type of barcode) is becoming commonplace. Barcodes traditionally were used to uniquely label products, now barcodes can also be used to transact for services with enterprises or agencies. The QR code can also be used to acquire additional information about something of interest and can even be linked to profiles or products and/or individuals. In fact, there are many uses today for barcodes and QR codes; also, in order to provide security many barcodes are often digitally signed and/or encrypted.

Yet, still another technology is emerging in the industry to automate transactions of consumers. This technology is referred to as Near Field Communications (NFC). NFC is a set of short-range wireless technologies, which are beginning to be embedded in portable devices of consumers, such as cellular phones. NFC can be used for access control, information collection and exchange, loyalty transactions, coupon gathering, payment processing, and the like. NFC can also be used to power passive target objects, such as tags on billboards, displays, and/or products for purposes of transacting with the target objects. Moreover, NFC can be used with peer-to-peer transacting when two devices are equipped to communicate using NFC.

Many organizations are already investing in the provision of barcodes to mobile devices to allow consumers to use the barcode in place of the printer paper based equivalent; as an example, many airlines send a 2D (two-dimensional) barcode to a customer's mobile phone. This allows the consumer to get through security and board the flight. Adoption has been limited thus far and many airports have yet to invest in the bar code scanning at the security checkpoint, although this is on the increase. This highlights the impact on technology adoption (and hence associated cost reductions, ease of use, etc.) when more than one system is running in parallel. This problem will be further compounded as many enterprises move to NFC technologies—consumers using the NFC capability in their mobile device to pass security and board their flight when there may be three systems in place. Additionally as part of the traveler's journey they may need to use paper, barcode or NFC to access other services—airline lounges, kiosks to change seats, gate desk for standby upgrades, etc. These may all stem from the same purchase, for example a business-class return ticket where one sheet of paper was all that was required.

So, the problem is at different locations and at different times an enterprise may only be able to support barcode processing whereas the consumer's mobile phone is equipped with NFC capabilities. In another scenario, an enterprise is equipped to handle NFC capabilities but the consumer's mobile phone has a barcode for a given transaction.

SUMMARY

In various embodiments, techniques for interoperability between barcodes and Near Field Communications (NFC) are presented. According to an embodiment, a method for transaction via interoperability of barcodes and NFC is discussed.

Specifically, a mobile converter application is configured for processing on a target mobile device. Next, the mobile converter application is distributed to the target mobile device. The mobile converter application is initiated on the target mobile device; the mobile converter application resident in the mobile device: for converting barcodes to Near Field Communication (NFC) codes and the NFC codes to the barcodes for automated transactions or for remotely acquiring conversions for the barcodes to NFC codes and NFC codes to the barcodes.

DETAILED DESCRIPTION

The embodiments herein provide a barcode to NFC conversion application (and vice-versa), which can run on a user's mobile device or on a remote device (such as a server of cloud environment) over a suitable communication medium, such as but not limited to a 3G or 4G wireless network and the like. This can be achieved in a number of ways:

For example, a standalone application can be used that consumers download to their NFC-enabled device. The barcode can be augmented to have built in codes that automatically initiate a conversion application resident on the mobile device. The barcode can be augmented to have its own application that will undertake the conversion to the appropriate codes for the NFC device.

Moreover, the embodiments herein can also be developed to undertake the reverse from the NFC code, i.e. if an organization issues an NFC code to a consumer's mobile device, the application can then use that to create a barcode that can be displayed on the mobile device and allow interoperability.

The techniques herein allow a source organization just to issue a barcode, which can be then used on all technologies hence minimizing issuing complexity but maximizing adoption and allowing the consumer ease of interoperability. Users can then use mixed technology environments—e.g. barcode at security, NFC at the airline lounge and boarding, etc.

In an alternative approach, the consumer's mobile device includes an application that interfaces with a remote server or cloud environment for purposes of converting between barcodes and NFC codes and/or vice versa. In this case, the remote server or cloud environment can be provided by barcode and/or NFC code issuers or providers. In some cases, this can be provided by a third-party service that is independent of the barcode and/or NFC code issuer or provider.

In still other situations, remote processing with a remote server or cloud environment can be used to provide security and/or encryption services for the barcodes and/or NFC codes.

The embodiments herein are also applicable in other industries: retail where the barcode can be a coupon and used in a store with barcode readers or one with NFC readers, the same in financial or medical for accessing an appointment in a branch or clinic, etc.

It is within this initial context that specific embodiments are now discussed with reference to the FIGS. 1-3.

Figure 1:
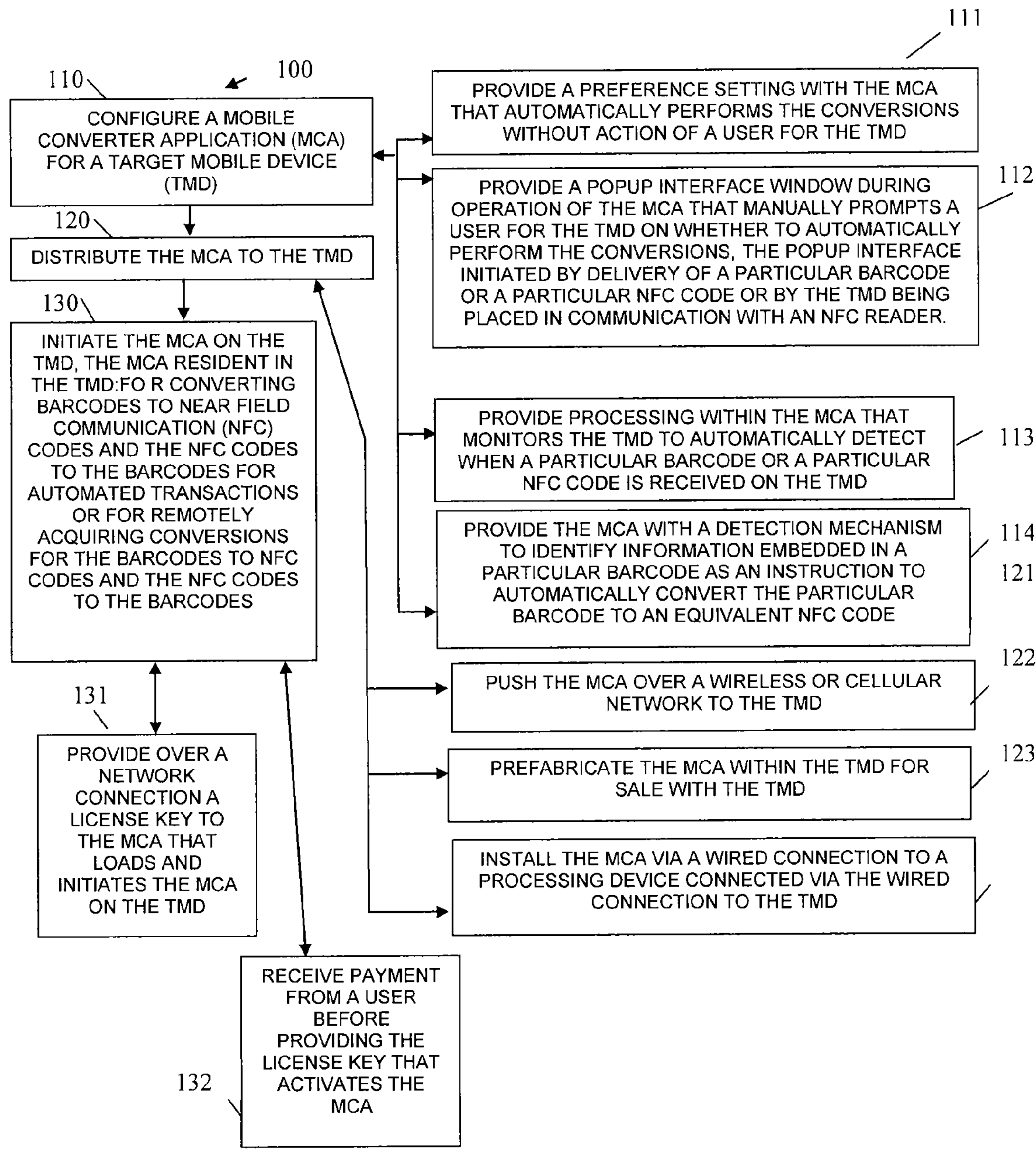
FIG. 1 is a diagram of a method for transaction via interoperability of barcodes and NFC is provided, according to an example embodiment.

FIG. 1 is a diagram of a method 100 for transaction via interoperability of barcodes and NFC is provided, according to an example embodiment. The method 100 (hereinafter "interoperability manager") is implemented as instructions programmed and residing on a non-transitory computer-readable (processor-readable) storage medium and executed by one or more processors. The processors are specifically configured and programmed to process the interoperability manager. In an embodiment, the interoperability manager may operate over a network. The network is wireless or a combination of wired and wireless.

In an embodiment, the interoperability manager executes, once deployed and initiated, as a barcode to NFC and an NFC to barcode conversion application on a mobile device, such as a phone, a laptop, and/or a tablet. The mobile device is enabled for barcode and NFC processing. Moreover, in some cases the interoperability manager can be pre-installed on the mobile device and distributed with the sale of the mobile device or the interoperability manager can be downloaded wirelessly download from a remote location over a wireless network connection and installed on the mobile device.

In another embodiment, the interoperability manager configures the mobile converter application to subsequently interact with the interoperability manager or another third-party remote service for purposes of performing the conversions on behalf of the mobile device and remote from the mobile device.

At 110, the interoperability manager configures a mobile converter application for a target mobile device. The target mobile device can be such things as a satellite phone, a cellular phone, a tablet (iPad®, etc.), and the like. Depending on the operating system of the target mobile device and the resources available from that operating system, the interoperability manager appropriately configures the mobile converter application for deployment to and subsequent execution on the target mobile device and its processing environment.

According to an embodiment, at 111, the interoperability manager provides a preference setting with the mobile conversion application that automatically performs the conversions (as discussed below with reference to the processing at 130) without action of a user for the target mobile device.

In another instance, at 112, the interoperability manager provides a popup interface window during operation of the mobile converter application that manually prompts a user for the target mobile device on whether to automatically perform the conversions (discussed below with reference to the processing at 130). That is, when a new barcode or a new Near Field Communication (NFC) is detected on the target mobile device, the mobile converter application can prompt the user for action to take (either convert or not convert). The actual popup window can be initiated by delivery of the barcode or NFC code to the mobile device or by the mobile device being placed near an NFC reader so as to establish a communication link between the NFC reader and the mobile device.

In yet another situation, at 113, the interoperability manager provides processing within the mobile converter application that monitors the target mobile device to automatically detect when a particular barcode or a particular NFC code is received on the target mobile device.

In another scenario, at 114, the interoperability manager provides the mobile converter application with a detection mechanism to identify information embedded in a particular barcode as an instruction to automatically convert the particular barcode to an equivalent NFC code.

At 120, the interoperability manager distributes the mobile converter application to the target mobile device. This distribution can occur in a variety of manners.

For example, at 121, the interoperability manager pushes the mobile converter application over a wireless or cellular network to the target mobile device. The wireless network can be WiFi, Radio Frequency (RF), Blue Tooth, or satellite based. The cellular network is a data channel used by cellular carriers to distribute data wirelessly to mobile phones.

In another distribution technique, at 122, the interoperability manager prefabricates the mobile converter application within the target mobile device for sale and/or distribution of the target mobile device. In other words, the target mobile device can be manufactured and initially configured with the mobile converter application.

In still another technique, at 123, the interoperability manager installs the mobile converter application via a wired connection to a processing device connected via the wired connection to the target mobile device. Here, the target mobile device can be connected, such as via a Universal Serial Bus (USB) to another device, such as a computer and the mobile converter application can be installed on the target mobile device from the computer.

At 130, the interoperability manager initiates the mobile converter application on the target mobile device. The mobile converter application is resident in the target mobile device for converting barcodes to NFC codes and for converting NFC codes to barcodes for automated transactions that a user engages in with the target mobile device or the mobile converter application is configured to communicate with a remote server or cloud environment to perform the conversions remote from the mobile device on behalf of the user.

According to an embodiment, at 131, the interoperability manager provides over a network connection a license key to the mobile converter application that loads and initiates the mobile converter application on the target mobile device.

In another situation, at 132, the interoperability manager receives payment from a user before providing a license key that activates the mobile converter application.

Figure 2:
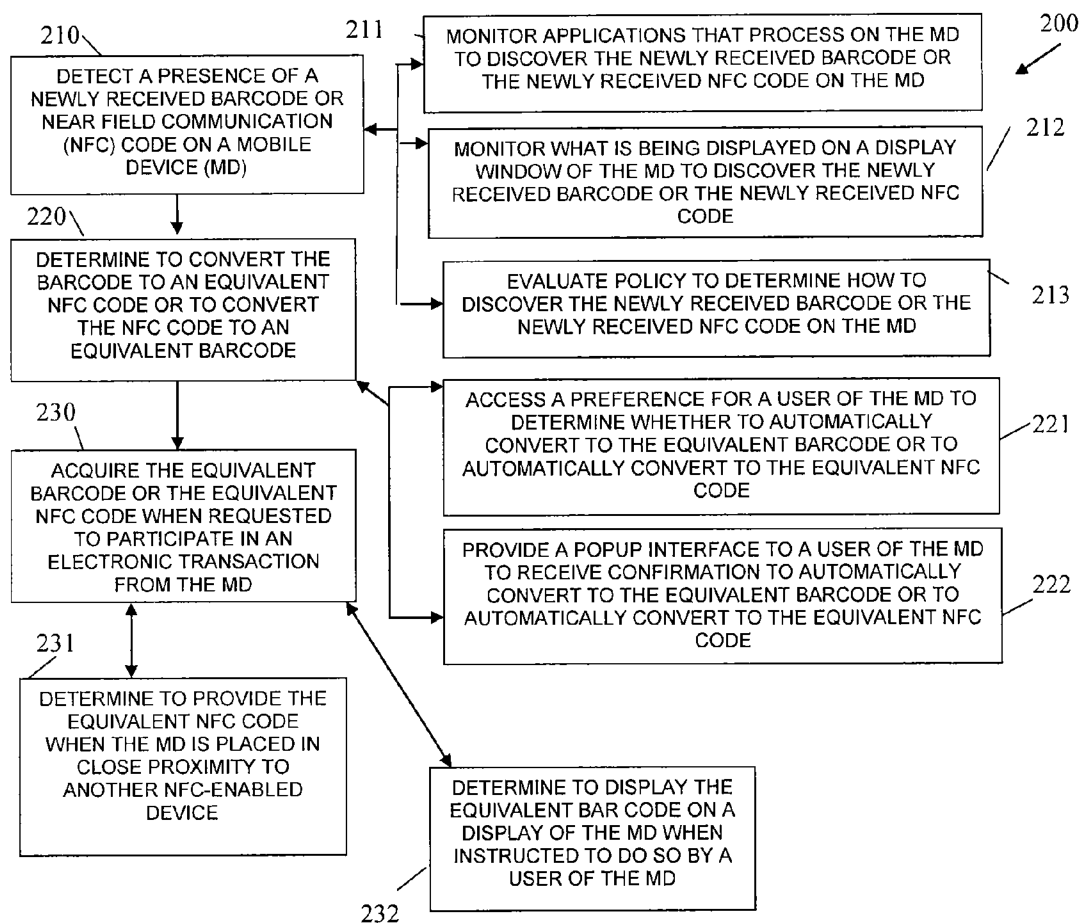
FIG. 2 is a diagram of another method for transaction via interoperability of barcodes and NFC is provided, according to an example embodiment.

FIG. 2 is a diagram of another method 200 for transaction via interoperability of barcodes and NFC is provided, according to an example embodiment. The method 200 (hereinafter "mobile converter app") is implemented as instructions and programmed within a non-transitory computer-readable (processor-readable) storage medium that executes on one or more processors of a mobile device, the processors of the mobile device are specifically configured to execute the mobile converter app. In an embodiment, the mobile converter app is operational over a network; the network is wireless or a combination of wired and wireless. Although it is noted that transactions performed by the mobile do not require any network connectivity whatsoever and can occur in peer-to-peer (P2P) connections.

The mobile converter app again describes processing actions from the perspective of the customer's mobile device. The processing is associated with transacting with a device at an endpoint location, the mobile converter app initially configured and perhaps acquired by the method 100 of the FIG. 1.

At 210, the mobile converter app detects a presence of a newly received barcode or NFC code on a mobile device. The detection of the newly received barcode or NFC code can occur in a variety of manners.

For example, 211, the mobile converter app monitors applications that process on the mobile device to discover the newly received barcode or the newly received NFC code on the mobile device.

In another case, at 212, the mobile converter app monitors what is being displayed on a display window of the mobile device to discover the newly received barcode or the newly received NFC code.

In still another situation, at 213, the mobile converter app evaluates policy to determine how to discover the newly received barcode or the newly received NFC code on the mobile device.

At 220, the mobile converter app determines to convert the barcode to an equivalent NFC code to convert the NFC code to an equivalent barcode.

According to an embodiment, at 221, the mobile converter app access a preference for a user of the mobile device to determine whether to automatically convert to the equivalent barcode or to automatically convert to the equivalent NFC code. In other words, a default preference or a profile for the user provides an indication to the mobile converter app to automatically perform the conversions for interoperability between barcodes and NFC codes.

In an embodiment, at 222, the mobile converter app provides a popup interface to a user of the mobile device to receive a confirmation to automatically convert to the equivalent barcode or to automatically convert to the equivalent NFC code. Here, the decision on whether to convert or not to convert is vested in the user via interaction with the popup interface.

At 230, the mobile converter app acquires the equivalent barcode or the equivalent NFC code when requested to participate in an electronic transaction from the mobile device. Acquisition can occur remote from the mobile device or directly via processing on the mobile device. This can occur in a variety of manners.

For example, at 231, the mobile converter app determines to provide the equivalent NFC code when the mobile device is placed in close proximity to another NFC-enabled device. This can occur when the mobile device physically touches the NFC-enabled device as well.

In another situation, at 232, the mobile converter app determines to display the equivalent barcode on a display of the mobile device when instructed to do so by a user of the mobile device. That is, the user can use the mobile converter app to manually instruct the mobile converter app to supply the equivalent barcode.

Figure 3:
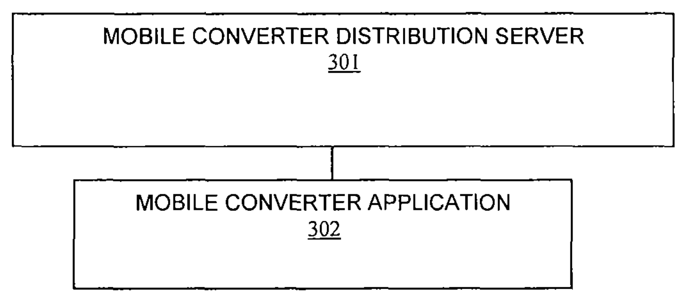
FIG. 3 is a diagram of a barcode and NFC interoperability transacting system, according to an example embodiment.

FIG. 3 is a diagram of a barcode and NFC interoperability transacting system 300, according to an example embodiment. The barcode and NFC interoperability transacting system 300 includes one or more processors that are specifically configured to perform, inter alia, the processing associated with the methods 100 and 200 of the FIGS. 1 and 2, respectively. Furthermore and in an embodiment, the barcode and NFC interoperability transacting system 300 is operational over a network and the network can be wireless or a combination of wired and wireless. In an embodiment, the network is the Internet. In another case, the network is a cellular network. It may also be that the network uses both the Internet and a cellular network. It is also noted that direct transactions at a point-of-sale terminal do not require any network connectivity. So, some operations of the barcode and NFC interoperability transacting system 300 may require no network connectivity at all.

The barcode and NFC interoperability transacting system 300 includes a mobile converter distribution server 301 and a mobile converter application 302. Each of these and their interactions with one another will now be discussed in turn.

The mobile converter distribution server 301 is one or more processing devices. The mobile converter distribution server 301 is accessible over a network, such as the Internet or a cellular network. The mobile converter distribution server 301 includes a variety of applications, such as the interoperability manager, discussed above with reference to the method 100 of the FIG. 1.

The mobile converter distribution server 301 is configured to configure an instance of the mobile converter application 302 and configured to distribute the instance of the mobile converter application 302 to a mobile device for deployment.

The mobile converter application 302 is implemented and programmed within a non-transitory computer-readable medium and for execution on the mobile device. Example aspects of the mobile converter application 302 were presented above with reference to the methods 100 and 200 of the FIGS. 1 and 2, respectively.

The mobile converter application 302 is configured to automatically detect a presence of newly received barcodes or newly received NFC codes on the mobile device. The mobile converter application 302 also configured to convert the received barcodes into equivalent NFC codes and configured to convert the received NFC codes into equivalent barcodes. In some instances, the mobile converter application 302 is alternatively configured to interact with a barcode and/or NFC issuer to remotely perform the conversions. Further, the mobile converter application 302 configured to provide particular ones of the equivalent barcodes or the equivalent NFC codes on demand to facilitate an automated transaction with the mobile device.

In an embodiment, the mobile converter application 302 is also configured to interact with a remote third-party service to provide security validation of the barcodes and the NFC codes, via digital signatures and/or encryption.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A processor-implemented method programmed in a non-transitory processor-readable medium and to execute on one or more processors configured to execute the method, comprising:

configuring a mobile converter application for a target mobile device;

distributing the mobile converter application to the target mobile device; and automatically initiating the mobile converter application on the target mobile device based on built in codes within barcodes, the mobile converter application resident in the target mobile device: for converting the barcodes to Near Field Communication (NFC) codes for automated transactions or for remotely acquiring conversions for the barcodes to NFC codes.

2. The method of claim 1, wherein configuring further includes providing a preference setting with the mobile converter application that automatically performs the conversions without action of a user for the target mobile device.

3. The method of claim 1, wherein configuring further includes providing a popup interface window during operation of the mobile converter application that manually prompts a user for the target mobile device on whether to automatically perform the conversions, the popup interface initiated by delivery of a particular barcode or a particular NFC code or by the target mobile device being placed in communication with an NFC reader.

4. The method of claim 1, wherein configuring further includes providing processing within the mobile converter application that monitors the target mobile device to automatically detect when a particular barcode or a particular NFC code is received on the target mobile device.

5. The method of claim 1, wherein configuring further includes providing the mobile converter application with a detection mechanism to identify information embedded in a particular barcode as an instruction to automatically convert the particular barcode to an equivalent NFC code.

6. The method of claim 1, wherein distributing further includes pushing the mobile converter application over a wireless or cellular network to the target mobile device.

7. The method of claim 1, wherein distributing further includes prefabricating the mobile converter application within the target mobile device for sale with the target mobile device.

8. The method of claim 1, wherein distributing further includes installing the mobile converter application via a wired connection to a processing device connected via the wired connection to the target mobile device.

9. The method of claim 1, wherein initiating further includes providing over a network connection a license key to the mobile converter application that loads and initiates the mobile converter application on the target mobile device.

10. The method of claim 9, wherein providing further includes receiving payment from a user before providing the license key that activates the mobile converter application.

11. A processor-implemented method programmed in a non-transitory processor-readable medium and to execute on one or more processors configured to execute the method, comprising:

detecting a presence of a newly received barcode on a mobile device;

automatically determining to convert the barcode to an equivalent NFC code based on built in codes within the barcode; and acquiring the equivalent NFC code when requested to participate in an electronic transaction from the mobile device.

12. The method of claim 11, wherein detecting further includes monitoring applications that process on the mobile device to discover the newly received NFC code on the mobile device.

13. The method of claim 11, wherein detecting further includes monitoring what is being displayed on a display window of the mobile device to discover the newly received NFC code.

14. The method of claim 11, wherein detecting further includes evaluating policy to determine how to discover the newly received NFC code on the mobile device.

15. The method of claim 11, wherein determining further includes accessing a preference for a user of the mobile device to determine whether to automatically convert to the equivalent NFC code.

16. The method of claim 11, wherein determining further includes providing a popup interface to a user of the mobile device to receive confirmation to automatically convert to the equivalent NFC code.

17. The method of claim 11, wherein acquiring further includes determining to provide the equivalent NFC code when the mobile device is placed in close proximity to another NFC-enabled device.

18. The method of claim 11, wherein acquiring further includes determining to display an equivalent bar code on a display of the mobile device when instructed to do so by a user of the mobile device.

19. A system, comprising:

a mobile converter distribution server; and a mobile converter application implemented and programmed within a non-transitory computer-readable medium and for execution on a mobile device;

the mobile converter distribution server configured to configure an instance of the mobile converter application and configured to distribute the instance to the mobile device, the mobile converter application configured to automatically detect a presence of newly received barcodes on the mobile device, the mobile converter application configured to convert the received barcodes into equivalent NFC based on built in codes within the barcodes or the mobile converter application configured to acquire conversions for the equivalent NFC codes from a remote service provided by a NFC code issuer, and the mobile converter application configured to provide particular ones of the equivalent NFC codes on demand to facilitate an automated transaction with the mobile device.

20. The system of claim 19, wherein the mobile converter application is configured to interact with a remote third-party service to provide security validation of the NFC codes, via digital signatures and/or encryption.

* * * * *